R. HOELEMANN.
SPRING SAFETY LATCH.
APPLICATION FILED NOV. 9, 1917.
1,310,018.
Patented July 15, 1919.
3 SHEETS—SHEET 2.
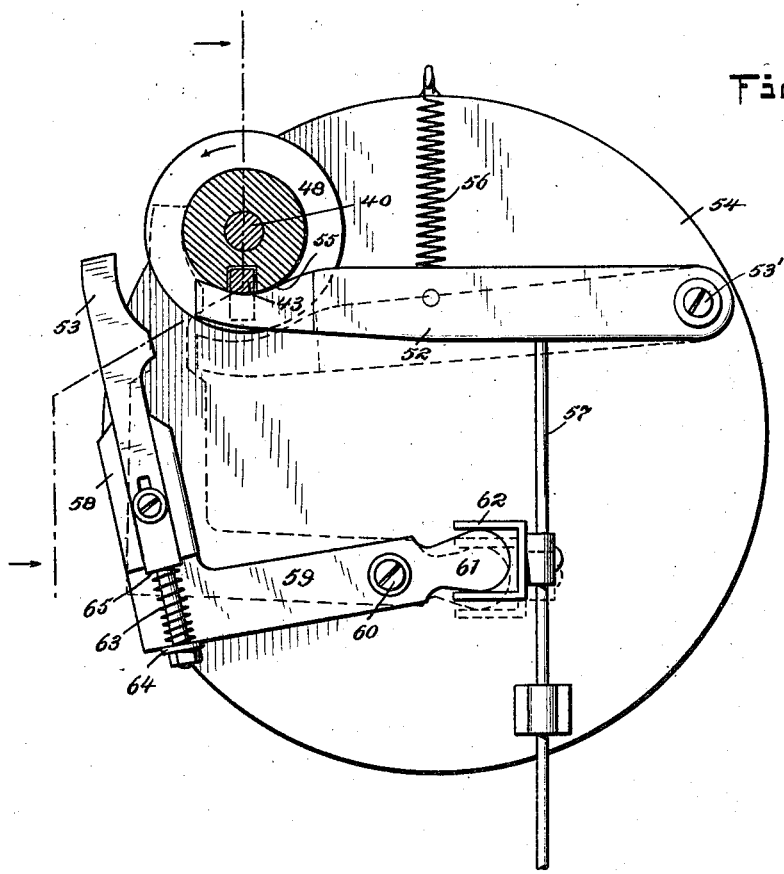
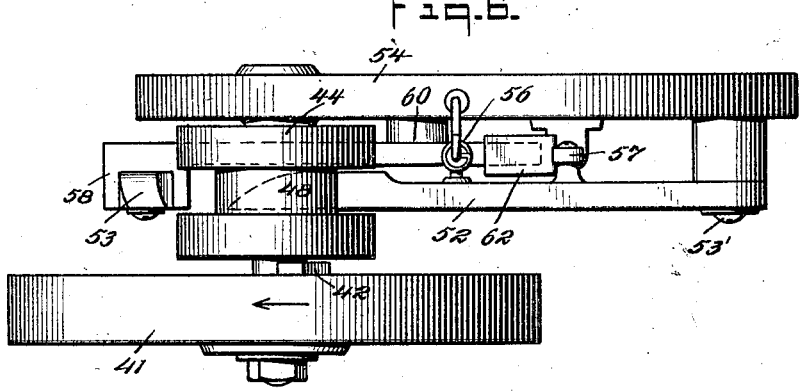
WITNESS:
INVENTOR
Richard Hoelemann
BY
Warren S. Orton.
ATTORNEY.

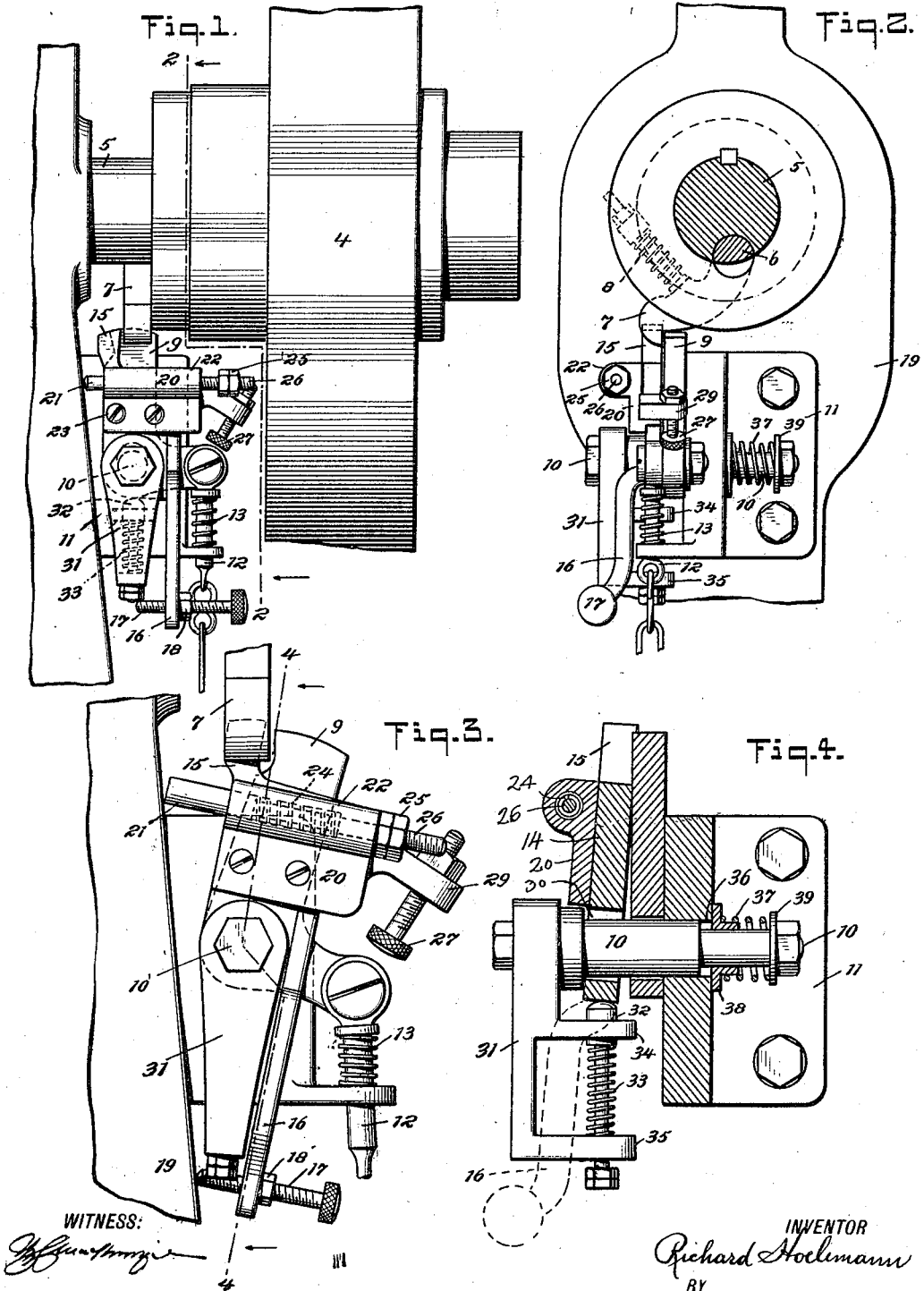

R. HOELEMANN.
SPRING SAFETY LATCH.
APPLICATION FILED NOV. 9, 1917.
1,310,018.
Patented July 15, 1919.
3 SHEETS—SHEET 3.
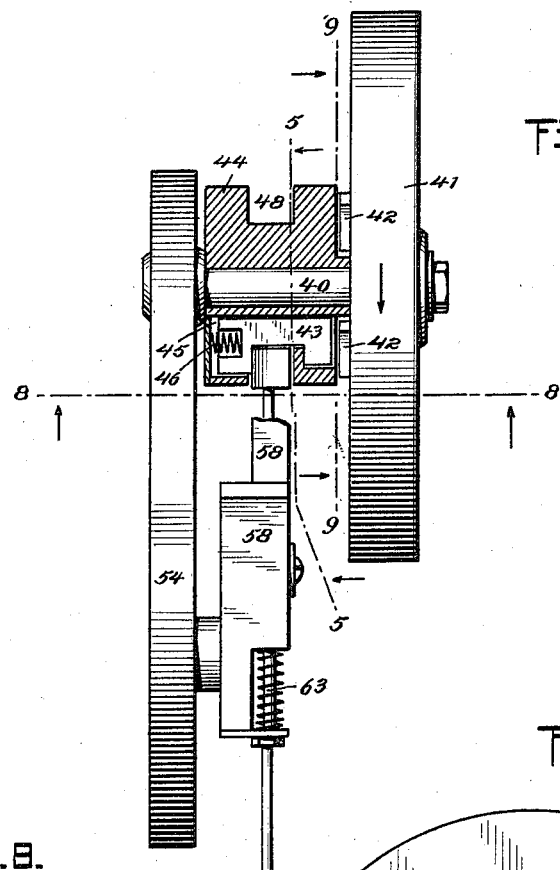
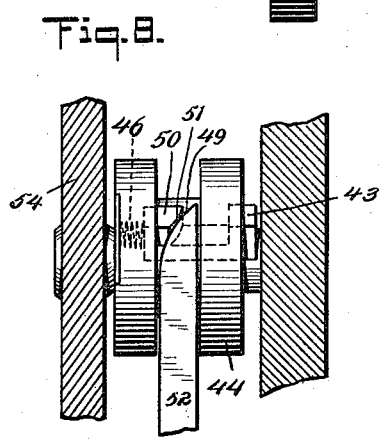
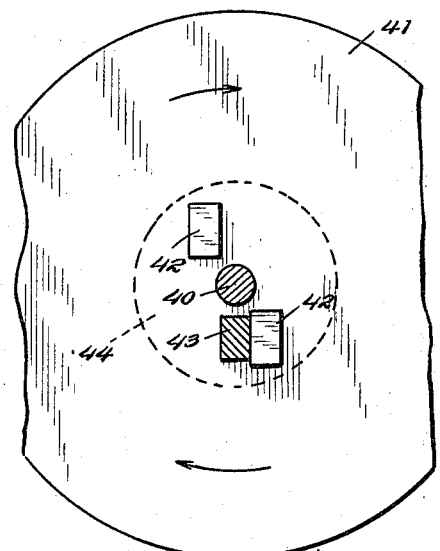
WITNESS:
INVENTOR
Richard Hoelemann
BY
Warren S. Orton
ATTORNEY

UNITED STATES PATENT OFFICE.

RICHARD HOELEMANN, OF NEW YORK, N. Y.

SPRING SAFETY-LATCH.

1,310,018.  Specification of Letters Patent.  Patented July 15, 1919.

Application filed November 9, 1917. Serial No. 201,048.

*To all whom it may concern:*

Be it known that I, RICHARD HOELEMANN, a citizen of the United States, and a resident of the city of New York, county of Queens, and State of New York, have invented certain new and useful Improvements in Spring Safety-Latches, of which the following is a specification.

My invention relates in general to a non-repeating safety device for use in connection with a clutch mechanism of the type where the clutch is moved into active position for a single operation of a machine and stopped automatically at the end of the desired period of operation so as to guard against injury to the operator by repeated operations of the machine, and the invention constitutes an improvement over such devices as are identified in my co-pending application, Serial No. 103,686, filed June 14, 1916.

In the device disclosed in this prior application the revolving power element strikes against the stop mechanism which, especially in the heavier type machines, imposes a severe strain on the mechanism, frequently breaking off the portion of the stop member engaged by the revolving power element.

Accordingly, the primary object of the invention is to provide a simple form of stop mechanism in advance of the class described adapted to take up the shock of the impinging power member as it comes in contact therewith and to gradually ease down the force of this power member thus minimizing the effect of rupturing strains.

One means for attaining this result in the device disclosed in the above identified application is to mount the attachment resiliently so that the effect of the blow caused by the power member is absorbed by a relatively heavy cushioning spring.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Not only may the shock be absorbed through the mounting of the entire attachment as above suggested, but it may be absorbed by a resiliently mounted member forming a part of the attachment and constituting the first blow receiving element thereof. Accordingly in the accompanying drawings, which show two embodiments of the invention, Figures 1 to 4 correspond to the form of the invention illustrated in the above identified application; and Figs. 5 to 9 illustrate a form of the invention in which only the part directly receiving the shock is resiliently cushioned.

In the accompanying drawings:—

Fig. 1 is a view in side elevation of a portion of a power press showing a form of clutch mechanism used with such machines with the parts in locking position and showing a preferred embodiment of my invention in normal inoperative position thereon with parts thereof broken away to show internal construction;

Fig. 2 is a transverse sectional view taken on the broken line 2—2 of Fig. 1;

Fig. 3 is a view in side elevation of certain of the parts shown in Fig. 1, showing the safety attachment in active clutch locking position;

Fig. 4 is a transverse sectional view taken on the line 4—4 of Fig. 3;

Fig. 5 is a transverse sectional view through a modified form of my invention and taken on the line 5—5 of Fig. 7;

Fig. 6 is a plan view of the device looking down upon the disclosure in Fig. 5;

Fig. 7 is a vertical sectional view taken on the line 7—7 of Fig. 5; and

Figs. 8 and 9 are respectively horizontal and vertical sectional views taken respectively on the lines 8—8 and 9—9 of Fig. 7.

In the following description and in the claims, parts will be identified by specific names for convenience of expression but they are intended to be as generic in their application to similar parts as the art will permit.

In the drawings and referring particularly to the first form of the invention there is shown a clutch wheel 4 loosely mounted upon the crank shaft 5 and a clutch mechanism 6 including the projecting rocker arm 7, normally moved into clutching position by the rocker arm spring 8 as is usual with one well known type of clutch mechanism. It is usual in such machines to hold the rocker arm in its unclutched or inoperative position by means of a trip dog 9 pivotally mounted upon a pivot bolt 10 carried in a bracket 11 and moved into unlatched position by means of a treadle rod 12 controlled by the foot or hand of the operator. Such devices also include a relatively strong treadle rod spring 13 designed to move the trip dog into its locking position disposed across the path of movement of the rocker arm when tension is released on the treadle rod. It is to be understood that the construction so far described is well known and the invention hereinafter described particularly relates to an attachment designed to be mounted upon the pivot bolt 10 which is elongated to accommodate the attachment.

The attachment includes a rocker frame 14, the upper end of which is provided with a projecting finger 15 constituting a stop similar to the usual trip dog and designed, when the rocker arm is in its normal position held by the trip dog, to bear against the side of the rocker arm so that normally the rocker arm constitutes a stop for maintaining the projecting finger 15 in an inoperative position as shown in Figs. 1 and 2.

The rocking frame includes a depending tail 16, threaded through which is a setscrew 17, locked in position by the nut 18 and designed to bear against some suitable stop 19, which, in the device disclosed, may be some fixed part of the machine. The rocking frame also includes a kicking device 20 positioned above the bolt 10 for the purpose of moving the finger 15 into active position when released by the rocking arm. This kicking casing 22 demountably affixed to the rocking frame preferably by screws 23 to permit the ready separation of the plunger and its coacting parts for the purpose of repair or substitution for another kicking device. The plunger 21 is maintained normally in projected position toward the stop 19 by means of a spring 24 housed within the casing 22 but obviously having a tension less than the tension of the treadle rod spring 13. The plunger is designed to be set in adjusted position by lock nuts 25 engaging the rear threaded end 26 of the plunger which projects rearwardly from the casing 22.

The tension of the treadle rod spring 13 is transmitted to the rocking frame through an adjustable stop 27, in the form of a set screw locked in adjusted position in a rearward extension 29 from the portion of the locking frame above its fulcrum. This set screw is disposed in the path of the upward movement of the treadle rod, so that as tension is released on the treadle rod, the spring in re-setting the dog in the position shown in Fig. 1, will bear on the set screw 27 to move the rocking frame from the position shown in Fig. 3 into the upright position shown in Fig. 1.

Now instead of mounting the rocker frame 14 on the bolt 10 so as to have a close fit therein the bolt 10 is caused to pass through a vertically elongated aperture 30 shown particularly in Fig. 4, which aperture has a width substantially equal to the diameter of the bolt but which has a length vertically greater than the diameter of the bolt. The rocking member is supported resiliently from the bolt so that normally the bolt engages the lower portion of the aperture 30. To provide this resilient support, a bracket 31 is hung from the outer end of the bolt, which bracket supports a plunger 32 positioned below the frame 14 and bearing on the underside thereof so as to maintain the same in its raised position on the bolt. A spring 33 positioned between arms 34 and 35 extending laterally from the bracket acts on the plunger to cause the same to bear upwardly on the frame and thus maintain the same in its raised position shown in Fig. 1.

In order to permit some slight lateral play to the rocking frame on the bolt this bolt is itself resiliently mounted on the bracket in such a manner that free movement laterally of the rocker frame is permitted. This free play is provided by slidably mounting the bolt in an aperture 36 in the bracket and positioning thereon a spring 37 one end of which bears against a washer 38 inturned bearing against the bracket and the opposite end of which bears against a washer 39 demountably held in position by means of a nut 40 threaded onto the outer end of the bolt.

In operation, it will be understood that the clutch wheel 4 is rotating continuously and that when it is desired to actuate the crank shaft 5, the operator depresses the treadle rod, swinging the trip dog from the position shown in Fig. 1 into the position shown in Fig. 3, thus removing the dog from the path of movement of the rocker arm and at the same time placing the heavy treadle rod spring under tension, all as is usual with well known devices of this character.

The removal of the rocker arm from the path of swinging movement of the projecting finger 15 will permit the spring 24 to act on the plunger bearing against the stop 19 and thus re-act on the rocker frame to move the same into the set position shown in Fig. 3 or until the end of the set screw 17 comes in contact with its stop 19. This set screw has previously been so adjusted that the projecting finger 15 is now disposed in the path of movement of the rocker arm so that as the rocker arm rotates about in its shaft clutching position, it will now come in contact with the projecting finger disposed in its path with the result that the rocker arm is rocked against the tension of its holding spring and the clutch wheel thus automatically disconnected from the crank shaft.

As the arm 7 contacts with the projection 15 it will act thereon tending first, to rock the frame longitudinally of the shaft as shown in Fig. 4 thus compressing the spring 37 and at the same time will tend to depress the frame causing the same to bear on the plunger and compress the spring 33. This double rocking movement, however, will have no effect upon the stopping function of the finger 15 and will merely act to cushion the blow of the arm 7 coming against this member. The springs 33 and 37 will promptly restore the frame to its initial position, the spring 33 raising the frame on the bolt and the spring 37 acting through the bolt to cause the bracket 31 to bear on the rocker frame to move the same into abutting position against the dog 9.

It will be noted that this automatic unclutching by the auxiliary stop finger 15 will take place independent of the position of the treadle rod, so that the operator by pressing on the treadle will cause but one actuation of the crank shaft and the second stop 15 will automatically cause the clutch to be moved into inoperative position at the end of one rotation of the crank shaft. By adjusting the set screw 17 the attachment may be held in inoperative position which will not affect the usual operation of the machine.

Releasing tension on the treadle rod will cause the heavy spring 13 to act on the trip dog moving the same back into its operative position and acting through the set screw 27 acts on the rocker frame to move the same into its normal position shown in Fig. 1. At the same time the plunger spring 24 is placed under compression by the depression of the plunger bearing on the stop 19. This action removes the projecting finger 15 from the path of movement of the rocker arm and permits the rocker arm to move slightly into position stopped by the trip dog and the device is in position for a repetition of the actuation of the machine.

In the form of the invention illustrated in Figs. 5 to 9 inclusive there is shown a power shaft 40 carrying a fly wheel 41 which is provided with projecting lugs 42 on the inner side face thereof and constituting the driving member of a clutch connection. This member is adapted to engage a movable element 43 of a coacting clutch member in the form of a driven pulley 44 loosely mounted upon the shaft 40. The element 43 is in the form of a plunger mounted within a pocket 45 in the pulley 44 and normally maintained in position projected by means of a housed spring 46 toward the wheel 41 and in the path of the revolving members 42. The pulley 44 is provided with a peripheral groove 48 and the portion of the plunger 43 which extends across this groove is cut-away as shown at 49 and one side of the projection 50 thus formed is provided with a bevel side 51 facing the cut-away part 49.

Two stop members 52 and 53 are designed to be positioned in the groove 44 in order to engage the plunger 43 thereby to move the same into an inoperative position unclutching the member 43 from the members 42 and these stop members are so arranged relative to each other that when one is in an operative stopping position the other is in an inoperative position.

The stop member 52 is in the form of an arm pivotally mounted on the screw 53' engaging the support 54 and has its free end reduced and curved as shown at 55 so as to fit within the groove 44 and to bear with a sliding engagement against the hub of the pulley as shown more particularly in Fig. 5. The curved surface 55 engages the pulley on the underside thereof and is maintained in resilient engagement therewith by means of a spring 56. The stop member 52 is designed to be lowered into the inoperative position shown in the dotted lines in Fig. 5 by means of a treadle actuated rod 57. The second stop member 53 is positioned in advance of and normally spaced from the pulley and is slidably mounted in an upstanding guideway 58 constituting the upstanding member of an L-shaped lever 59 pivoted by means of the fulcrum screw 60 to the support 54. The end of the lever opposite the upturned end 58 is provided with a rounded head 61 which is pivotally engaged by a straddling bracket 62 carried by the rod 57. The connection is so arranged that when the rod 57 is depressed to move the stop member 52 into an inoperative position clear of the pulley, the lever 59 is swung about the pivot pin 60 so as to move the stop member 53 into the groove 54 and into the path of the revolving plunger 43.

In order to cushion the shock on the member 53 caused by the member 43 as it comes in contact with this second stop member 53, this member 53 is provided with a cushioning spring 63 one end of which bears upon a projection 64 from the lever 59 and the other end of which bears against a shoulder 65 formed by reducing the lower end of the stop member 53.

Considering the operation of the device disclosed in Figs. 5 to 9, inclusive, it will be understood that normally the stop members are in the positions shown in Fig. 5 with the stop member 52 engaging the beveled side 51 of the plunger 43 to maintain this element disconnected from the coacting clutch lugs 42.

In this position it is noted that the power shaft 40 is free to revolve without transmitting its motion to the pulley-wheel 44. Should it be desired to make such a connection that the pulley 44 is caused to revolve once, the rod 57 is depressed thus removing the stop member 52 from its holding engagement of the plunger 43 permitting the spring 46 to act on the plunger 43 and project the outer end of the same into clutching engagement with the next succeeding lug 42 in its revolving movement past the plunger. The shaft 40 is then connected to transmit its rotation to the pulley 44.

As the rod 57 is depressed thus permitting the escape of the plunger 43 from the stop member 52, the stop member 53 will be moved up into position as shown in dotted lines in Fig. 1 and into the path of movement of the oncoming plunger 43. As the plunger 43 is about to complete its circuit it comes in contact with the beveled end of the stop member 53 which will act upon the plunger 43 and move the same into the inoperative position shown in Fig. 7. The inward movement of the plunger will permit the lug 42 to pass the same thus breaking the connection between the driving shaft 40 and the pulley 44. This condition will persist as long as the rod 57 is held depressed. Permitting the rod 57 to rise will release the engagement of the stop member 53 with the plunger 43 thus permitting the plunger 43 to again engage with the lugs 42. This temporary engagement will cause the pulley 44 to be rotated a short distance or until the plunger 43 again comes into contact with the stop 42. The engagement with this advanced stop member will again shift the plunger and the clutch to its initial unclutched condition.

It is obvious that by either one of the devices disclosed, it is possible to depress the actuating rod and be insured that there will be but one rotation of the driven member. Further, it will be understood that the revolving member acquires some material momentum during its movement about the path, but the inertia of any such momentum will be absorbed and the shock reduced by the resilient mounting of the second stop member, thus cushioning the action of the power member as it is brought to its second or safety stop.

Having thus described my invention, I claim:—

1. In a device of the class described, the combination with a clutch mechanism having a definite path of travel, a pair of stop members each movable across the path of the clutch member to intercept the movement of the same, said mechanism normally held by the most advanced of the pair of stop members and means for removing said advanced member from the path and for interposing the other member across said path, of resilient means acting on said other member for absorbing the shock imposed thereon by said clutch mechanism contacting therewith.

2. In a device of the class described, the combination with a clutch mechanism having a definite path of travel, of a pair of stop members loosely mounted relative to each other and each movable across the path of the clutch mechanism to intercept the movement of the same, said mechanism normally held by the most advanced of the pair of stop members and said mechanism when in held position disposed in the path of movement of the other stop member, means for moving said advanced stop member from the path of the clutch mechanism thereby to permit the release of the clutch mechanism, means acting on the other stop member for moving this member automatically into the path of the clutch mechanism on the release of the most advanced stop member and cushioning means associated with said other stop member for cushioning the shock of the clutch mechanism.

3. A device of the class described, comprising a pivoting member, a trip dog pivoted to said member, a rocking frame loosely pivoted to said member for rotary movement about the same, said frame including a stop finger, means carried by the frame and acting thereon to move the finger into a set position, means for resetting said frame into a position different from said set position and means for moving the frame in a direction at right angles to the plane of its said rotary movement.

4. In a device of the class described, the combination with a member mounted to revolve about a path, two stop members positioned relatively close together considered circumferentially of said path and offset from each other transversely of said path, means acting on said stop members for removing from said path the stop member in advance of said revoluble member while positioning the other stop member in said path thereby to intercept the movement of the revoluble member as it approaches its complete revolution and means coacting with said other stop member for receiving the strain of impact by the revolving member on said other stop member.

5. In a device of the class described, the combination with a member mounted to revolve about a path, two stop members positioned relatively close together considered circumferentially of said path and offset from each other transversely of said path, means acting on said stop members for removing from said path the stop member in advance of said revoluble member while positioning the other stop member in said path thereby to intercept the movement of the revoluble member as it approaches its complete revolution and a cushioning spring for receiving the impact of the revolving member on said other stop member.

6. In a device of the class described, the combination with a member mounted to revolve about a path, a stop member mounted to be swung transversely across said path to intercept the movement of said revoluble member and a loose pivotal mounting for said stop member including a longitudinally shiftable bolt and said mounting adapted to permit the stop member to be depressed and shifted longitudinally of the bolt for a slight distance under the impact of the revoluble member pressing down on the same.

7. In a device of the class described, the combination with a member mounted to revolve about a path, a stop member mounted to be swung transversely across said path to intercept the movement of said revoluble member, a loose pivotal mounting for said stop member including a longitudinally shiftable bolt and said mounting adapted to permit the stop member to be depressed for a slight distance under the impact of the revoluble member pressing down on the same and a spring acting upwardly on said stop member and a second spring acting on said bolt and coacting with said first named spring for restoring the stop member to normal position after it has given under the impact of the revoluble member.

8. In a device of the class described, the combination with a clutch mechanism, and two stop members, each designed to intercept the movement of the clutch mechanism, manually controlled means for moving one of the stop members into an inoperative position to permit the escape of the clutch mechanism and means controlled by the escape of the clutch mechanism for moving the other stop member automatically into an operative position, a fixed bracket, a spring actuated plunger carried by the bracket and acting on said other stop member for holding the same resiliently in operative position.

9. In a device of the class described, the combination of a movable member, a stop normally positioned in advance of said member to intercept its movement, a second stop member for intercepting said movable member after it has been released from said first named stop member, a single control for simultaneously moving both of said stop members and means for easing down the movement of said movable member at said second stop member.

10. In a device of the class described, the combination of a pivoting support, a stop member pivoted to said support, a second stop member loosely pivoted to said support and free to have a movement in addition to rotary movement about said bolt, means acting on said stop members for moving one of the members into an inoperative position while moving the other stop member in a rotary direction about said support and from an inoperative into an operative position and means tending to hold the second stop member in position at one limiting place in its loose mounting.

11. An attachment for a machine including the combination with a revoluble member, of means for intercepting the revoluble movement of said member, and a control for said means adapted to remove the same from its position holding said revoluble member, said attachment including a resilient stop member for bringing said revoluble member gradually to rest at the end of its revolution following its release by said intercepting means and means for mounting said attachment in operative association with said machine.

12. In a device of the class described, the combination with a revoluble member, means for intercepting the revoluble movement of said member, a control for said means adapted to remove the same from its position holding said revoluble member, of a resilient stop member actuated by said control member to bring said revoluble member gradually to rest at the end of its revolution following its release by said intercepting means, and means for moving said resilient stop member into an inoperative position to permit the revoluble member to pass the same.

13. In a device of the class described, the combination of a rotary member, a pair of stop members, each adapted to be positioned across the path of movement of said rotary member to intercept its rotary movement, one of said stops mounted to give slightly in the direction of movement of said rotary member contacting therewith to cushion the stopping of the rotary member and resilient means acting on said members to maintain the same in normal relative position with one of the members disposed in said path and the other member offset from said path.

Signed at New York city in the county of New York and State of New York, this 7th day of November, A. D. 1917.

RICHARD HOELEMANN.

Copies of this patent may be obtained for five cents each, by addressing the "Commissioner of Patents, Washington, D. C."